L. W. ALDEN.
Plow-Clevis.
No. 52,123. Patented Jan. 23, 1866.
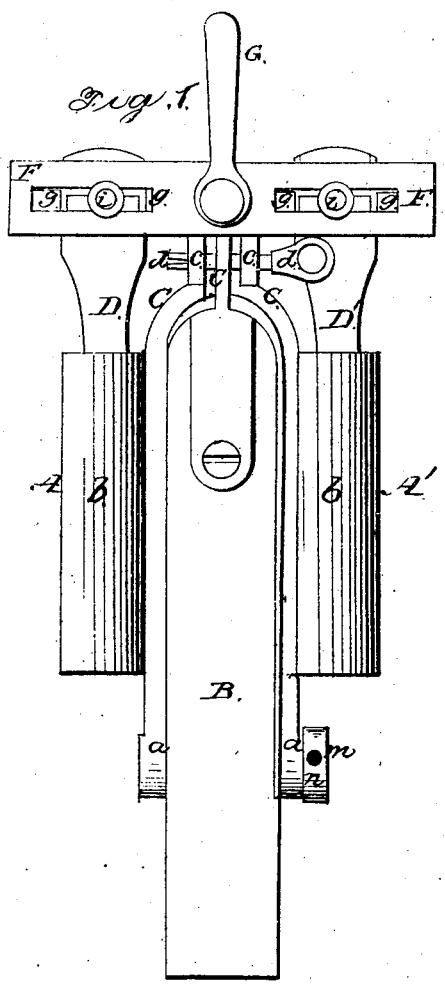
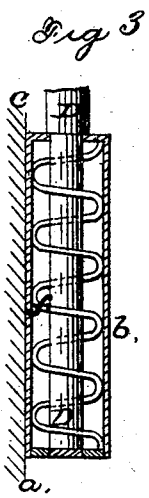
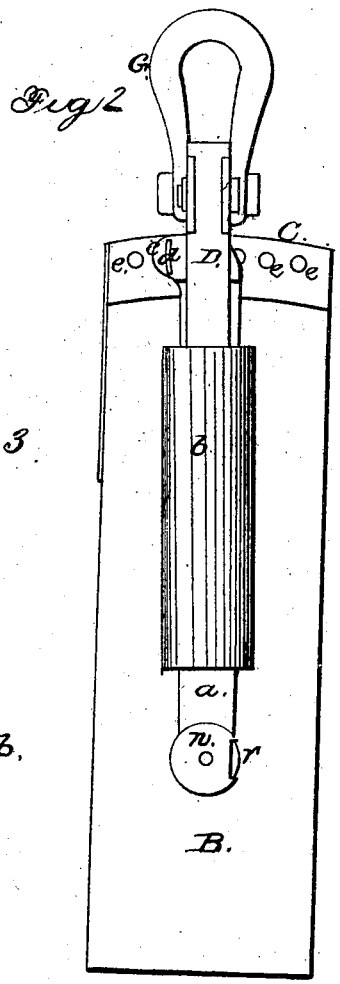
WITNESSES:
INVENTOR:
Loyall W. Alden
By atty A. B. Stoughton

United States Patent Office.

LOYAL W. ALDEN, OF FOSTERVILLE, NEW YORK.

IMPROVEMENT IN PLOW-CLEVIS.

Specification forming part of Letters Patent No. 52,123, dated January 23, 1866.

*To all whom it may concern:*

Be it known that I, LOYAL W. ALDEN, of Fosterville, in the county of Cayuga and State of New York, have invented a new and useful Improvement in a Spring-Clevis for Plows and other similar things; and I do hereby declare the following to be a full, clear, and exact description of the same, reference being had to the accompanying drawings, making a part of this specification, in which—

Figure 1 represents a top view of the clevis and a portion of the point of a plow-beam to which it is attached. Fig. 2 represents a side view of the same. Fig. 3 represents a section through one of the cylinders that contain the springs for allowing the clevis to yield to all sudden shocks.

Similar letters of reference, where they occur in the separate figures, denote like parts in all of them.

I am aware that a spring has been used in connection with a clevis to ease the concussion or shocks that the plow receives and relieve the horses' shoulders, and I do not therefore claim, broadly, such application, but claim the manner in which I construct and apply the spring-clevis.

My invention consists in a spring-clevis made in two sections, connected at their front by an equalizing-bar, to which the team is hitched, and lugs or arms through which and through a plate on the beam a pin may pass to raise or lower the line of draft, and pivoted at their rear to the beam to admit of this raising or lowering, as will be explained.

To enable others skilled in the art to make and use my invention, I will proceed to describe the same with reference to the drawings.

The two sections A A' may be alike, or made in right and left hand pieces, if they differ in any essential part, and they may be made of cast or wrought metal, or parts of each. Upon each of the sections there is cast or formed a suitable projection, $a$, by which they are to be bolted or pivoted to the beam B. Upon each section is cast or wrought a cylinder, $b$, for holding a spring of metal or any other suitable material, and upon each is cast or wrought arms or lugs $c$, by suitable holes in which the front end of the entire clevis may be raised up or let down to change the line of draft to suit the depth at which the plow is to run or the height of the team. This may be done by a pin or bolt, $d$, passing through said lugs and through a plate, C, secured to or in the beam, and furnished with suitable adjusting-holes $e e$, &c.

D D' are rods extending into the cylinder $b$, and surrounded therein by coiled springs $f$, or held therein by rubber or any other sufficiently elastic and durable springs. Upon the ends of the two rods D D is placed an equalizing-bar, F, having slots $g$ made in it to receive the bolts $i i$, that pass through said slots and through the projecting ends of the rods, which are properly flattened out, shouldered, or tenoned, so as to allow the gains in the equalizing-bar to move over or past them. To this equalizing-bar F, which can be adjusted laterally, the double-tree hook G is fastened.

The bolts $i i$ may be square-shanked bolts, so as to pass through the slots and square holes through the bars or rods D, and not turn around in them.

The pin $d$ may be made to fit into a hole, $m$, in the head of the screw-bolt $n$, by which the sections are pivoted or fastened to the beam for the purpose of removing said bolt $n$; and in the head of the bolt $n$ is formed a recess, $r$, to serve as a wrench for taking off or running on the nuts of the several bolts by which the parts are held together.

Having thus fully described my invention, what I claim therein, and desire to secure by Letters Patent, is—

In combination with the sectional plates and springs, pivoted at their rear to the beam and made adjustable thereto at their front ends, the equalizing-bar connected thereto, substantially in the manner and for the purpose described.

LOYAL W. ALDEN.

Witnesses:
 W. E. HUYHITT,
 D. SHEPARD.